United States Patent [19]

Helbing

[11] Patent Number: 5,324,337

[45] Date of Patent: Jun. 28, 1994

[54] METHOD FOR PRODUCING FIBER PRODUCT

[75] Inventor: Clarence H. Helbing, Shelbyville, Ind.

[73] Assignee: Knauf Fiber Glass GmbH, Fed. Rep. of Germany

[21] Appl. No.: 998,126

[22] Filed: Dec. 29, 1992

[51] Int. Cl.⁵ .................. C03C 25/02; C03B 23/20; B32B 17/02

[52] U.S. Cl. .................................. 65/3.4; 65/3.43; 65/4.4; 156/62.4

[58] Field of Search .................. 65/3.4, 3.43, 4.4; 427/389.8; 156/62.4; 128/6, 128, 101

[56] References Cited

U.S. PATENT DOCUMENTS

| | | | |
|---|---|---|---|
| 3,437,508 | 4/1969 | Gorski | 264/128 |
| 3,658,633 | 4/1972 | Jumentier | 156/62.4 |
| 3,676,095 | 7/1972 | Stalego | 65/3.4 |
| 3,877,911 | 4/1975 | Borst | 65/3 |
| 4,266,960 | 5/1981 | Scott et al. | 65/4 R |
| 4,288,475 | 9/1981 | Meeker | 427/389.8 |
| 4,296,164 | 10/1981 | Bemis | 264/128 |
| 4,517,236 | 5/1985 | Meeker et al. | 428/192 |
| 4,744,810 | 5/1988 | Battigelli | 65/4.4 |
| 5,123,949 | 6/1992 | Thiessen | 65/4.4 |
| 5,149,920 | 9/1992 | Meeker et al. | 181/290 |
| 5,169,571 | 12/1992 | Buckley | 264/128 |

FOREIGN PATENT DOCUMENTS 1114899  5/1968  United Kingdom .

*Primary Examiner*—W. Gary Jones
*Assistant Examiner*—John M. Hoffmann
*Attorney, Agent, or Firm*—Baker & McKenzie

[57] ABSTRACT

A fiberglass product usable as an end product or an intermediate product is formed as a pack in a forming station but only 1/7th of the conventional quantity of binder is applied. After curing to a self-sustaining form, additional binder is added at a location remote from the forming station in an amount in excess of the amount required in the final product and then the excess binder and moisture is removed by one or more vacuum stripping steps.

17 Claims, 2 Drawing Sheets

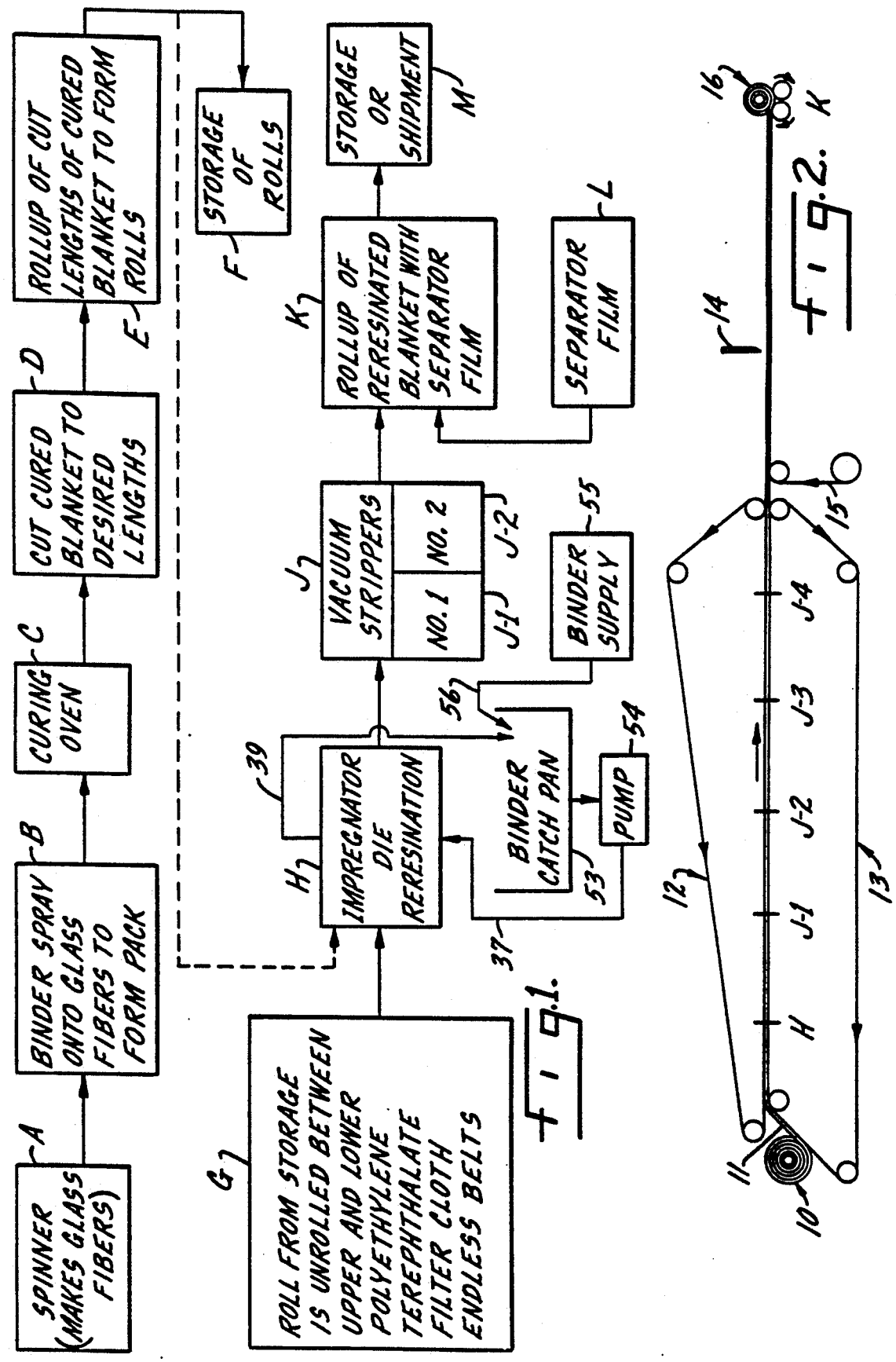

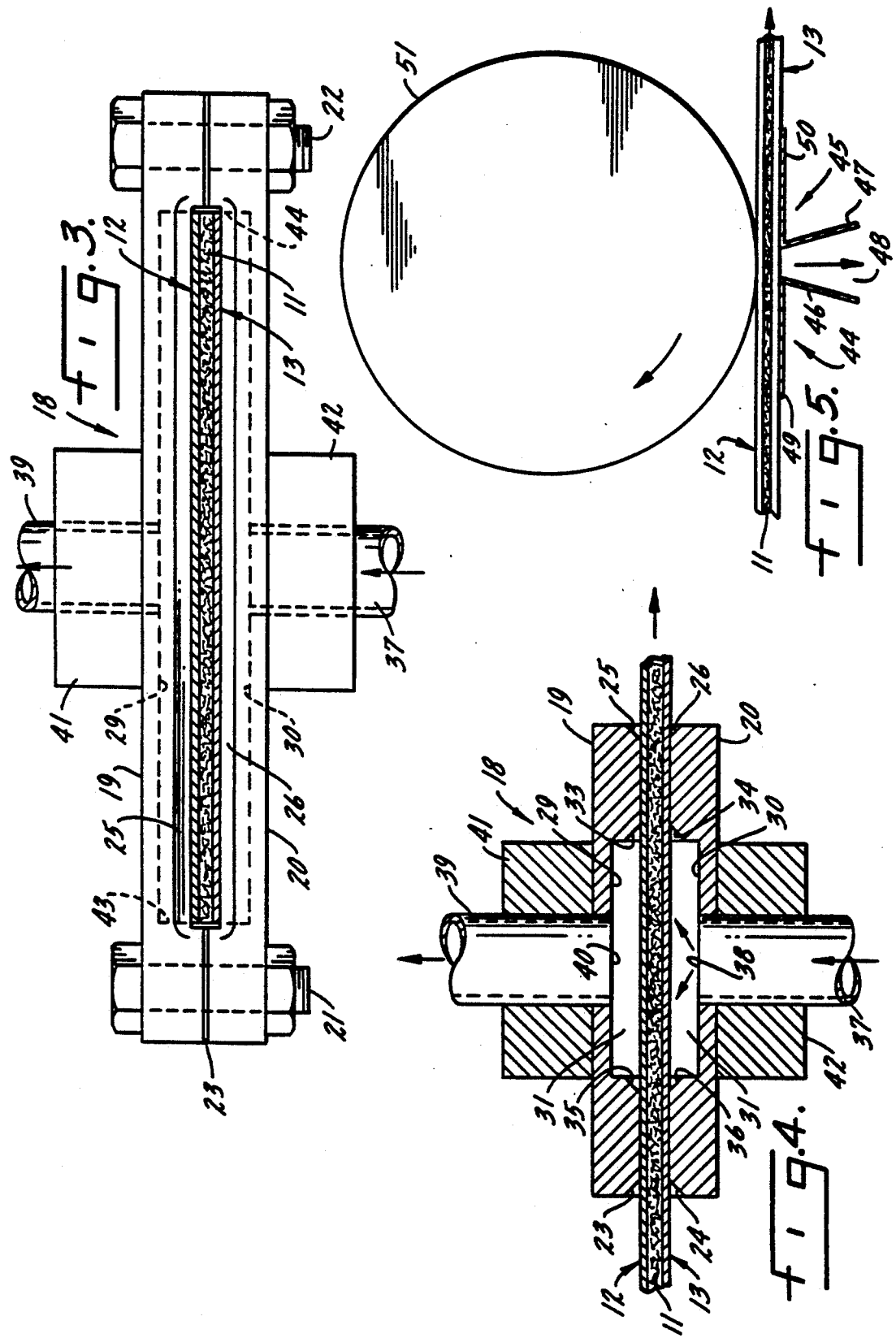

METHOD FOR PRODUCING FIBER PRODUCT

This invention pertains to a specialty fiberglass product and a method and apparatus for producing it. More specifically, it pertains to a fibrous product especially useful as a component in subsequently manufactured products, such as a roof liner for automobile interiors. Even more specifically, the invention pertains to the manufacture of such products by a method which very substantially eliminates pollution problems associated with the rotary spinner disc method of making fiberglass products while, at the same time, converting a higher percentage of the expensive binder component into useful product. Depending on such cost factors as the cost of the additional, non-conventional equipment required and the throughput of a given line, all of the above may be accomplished at lower cost per unit of product produced than is experienced with current conventional techniques used to produce the same or functionally equivalent products.

SUMMARY OF THE INVENTION

The invention is a cured fiberglass blanket product capable of being used in its as-manufactured of a subsequently manufactured product. To appreciate the advance in the art the conventional rotary spinner fiberglass process will be described as a reference.

In broad outline, a fiberglass pack is formed from molten glass which is dropped onto a rotating spinner disc and the glass thereafter formed into small diameter streams of molten glass as it leaves the spinner disc through fine holes formed in the disc walls under the influence of centrifugal force, followed by attenuation into fibers by a blast of hot gases which direct the fibers in a veil downwardly toward a takeaway conveyor. A binder, usually a thermosetting resin, is sprayed onto the falling veil of fibers so that when the pack of fibers on the conveyor are later heated in a curing oven the binder, upon curing, will bind the fibers one to the other to form a self-sustaining blanket. Water or another cooling fluid, usually a liquid, is also sprayed on the veil at the forming station. The water and, of necessity, some of the binder, is removed from the pack on the air pervious takeaway conveyor located at, and downstream of, the forming station. A further considerable quantity of binder is also removed from the pack as it passes through the curing station. This again results in a loss of binder from the pack and entrainment of the binder in the effluent from the curing oven; this requires subsequent removal therefrom prior to discharge of curing oven gases to the atmosphere.

Binder application in the forming station in an amount of about 18% by weight of the fiberglass is typical of this process.

The instant invention differs from the above described conventional process in that only roughly about 1/7th of the amount of binder applied in a conventional process as described above is applied at the forming station in the invention process. Thereafter the pack is cured so that a self-sustaining blanket is formed upon emerging from the curing station, usually an oven. As a result far lower quantities of binder and water are removed at the forming stations and similarly small quantities of binder are removed at the curing station so that the treatment of the excess binder and other waste is greatly simplified and, it is believed can be carried out at a higher efficiency. Additional supplemental binder which is needed to form a useful self-sustaining final product is added to the blanket after the first or preliminary application of binder has been made at the forming station and after the pack has been cured to form a blanket. Since the amount of the second or make up binder cannot be added with great precision given production line conditions, a slight excess of binder is added at an impregnation or re-resination station. Thereafter the excess is removed or stripped by application of vacuum to the moving blanket at a vacuum stripper station. The use of a plurality of vacuum strippers enables the final binder content to be controlled to a desired level. Since the make up binder is preferably applied by being entrained in room temperature air the effluent handling problem is greatly simplified over the effluent handling conditions which exist at the conventional forming station. By the same token, since the vacuum stripper action removes only a fraction of the binder applied at the re-resination station, and the binder can be at room temperature and can be conveniently recycled, the effluent load on the vacuum stripping station is very easily handled; indeed, with proper configuration a closed system can be utilized which eliminates nearly all atmospheric discharge and hence avoids or greatly reduces pollution concerns.

BRIEF DESCRIPTION OF THE INVENTION

The invention is illustrated more or less diagrammatically in the accompanying drawing in which FIG. 1 is a flow diagram of the unique process of this invention for producing the specialty fiberglass product;

FIG. 2 is a schematic disclosure of the re-resination portion of the method of this invention;

FIG. 3 is an end view of the impregnation die in the re-resination section of the system;

FIG. 4 is a longitudinal sectional view through the re-resination section of the system; and FIG. 5 is a partly diagrammatic longitudinal cross-section through the vacuum stripper section of the system.

DETAILED DESCRIPTION OF THE INVENTION

Like reference numerals will be used to refer to like parts from Figure to Figure throughout the following detailed description of the invention.

Referring first to FIG. 1 the invention is illustrated diagrammatically starting at a forming station; i.e.: just after the furnace forehearth, and ending at a storage or shipment station; if to the latter, it will be understood that the rolls will be further processed.

Station A is a conventional forming station in which a stream of molten glass drops onto a rotating spinner disc whose side walls have a large number of very fine holes. The stream of molten glass moves outwardly to the periphery of the disc and then is broken up into a plurality of streamlets of molten glass as the glass moves through the holes in the disc wall under the impetus of centrifugal force. A downwardly directed blast of hot gases of combustion then strike the hot streamlets at right-angles. The blast attenuates the streamlets into fibers, and the fibers form a downwardly falling veil.

At Station B, which is usually located just inches below Station A, a binder, usually a thermosetting resin, is sprayed on the downwardly falling veil of fibers to enable a pack of fibers, which result from the veil coming to rest on an air pervious takeaway conveyor, to be later formed into a self-sustaining blanket.

In a conventional binder application system resin and its carrier, usually water, are applied in an amount up to about 18% by weight of the pack on the takeaway conveyor. In this system as little as about 1/7th of that amount of binder and carrier is applied to the downwardly falling veil of fibers. No definitive amount of resin and carrier can be stated since the amount required will vary due to many factors including the ratio of resin to its carrier water, the curing capacity of the curing oven, the final product desired, and others. As a minimum the amount of resin added should be sufficient to ensure that the blanket which emerges from the subsequent curing oven is self-sustaining to the point where it can be cut and formed into rolls without deleterious degradation of the product.

As the fibers to which the binder has been applied to form a pack moves away from the fiber forming and binder spraying region, a vacuum is applied to the underside of the pack through the air pervious conveyor, usually a belt, by well-known equipment and hence a portion of the binder and water just applied will be drawn off as effluent. The amount of binder and carrier drawn off may be on the order of 20% of the amount applied to the veil of fibers, but this value is given as exemplary only and the actual quantity may be greater or lesser. The pack may be of any desired thickness and width depending on the glass feed rate to the spinner disc, the speed of the conveyor and the distribution pattern of the fibers on the conveyor. Convenient sizes might, for example, be 1 pound×1 inch to 2.5 pounds×1 inch product on 48 inch to 60 inch wide conveyors.

The pack to which a first or preliminary binder application has been made then leaves the effluent region after a portion of the binder and its carrier are drawn off and is moved downstream to the curing oven at curing station C. The rate of cure can vary as desired or as dictated by system parameters but in any event a self-sustaining blanket of glass fibers which are bound to one another by a cured binder to a degree sufficient for further processing is formed.

At Station D the self-sustaining blanket is cut into desired lengths preparatory to being rolled up. The mechanism for cutting fiberglass blankets into desired lengths on a production line are well-known and need not be described here.

At Station E the cut lengths are formed into rolls by means well-known in the art.

After roll up the resulting rolls are then placed in storage at Station F until they are needed for further processing in accordance with the invention.

At a later time, which may be a very short or a very long time period after a roll indicated generally at 10 in FIG. 2 is placed in storage, it is unrolled at Station G preparatory to further processing. At Station G the self-sustaining blanket 11, see FIG. 2, is unrolled between upper and lower filter cloth endless belts indicated generally at 12 and 13 respectively. The belts may be composed of polyethylene terephalate or any other suitable material capable of withstanding the corrosive environment, and the physical stresses inherent in the system.

The unrolled blanket which is sandwiched between upper and lower belts 12 and 13 then enters the impregnator die, Station H, to be re-resinated. At this station an additional or supplemental quantity of binder is added to the blanket, preferably, but not necessarily, at near ambient temperature conditions. As a practical matter a greater amount of resin will be added than is required in the final product because the addition process is difficult to control precisely. It is therefore far more efficient to add too much binder, and thereafter remove the unneeded excess by stages until the final content is achieved, rather than add too little binder and then reprocess the blanket again through the system or subject the blanket to a second re-resination procedure. The specific function of the re-resination station will be described in detail hereinafter. Although the weight of binder in the blanket per unit of area may vary widely, an amount on the order of about 600 grams of binder per square foot of blanket may be utilized.

Very shortly after exiting the re-resination Station H the blanket, now holding binder in an amount in excess of the final desired amount, enters the vacuum stripper Station J. Preferably the vacuum stripper station includes a plurality of vacuum 15 strippers of which two are indicated in FIG. 1, each of which is effective to remove a portion of the excess unneeded binder and its carrier. Again, no standard amount or even a range of quantities removed can be stated because of system variables. If a blanket exiting the re-resination station contains about 600 grams of resin per square foot, the blanket leaving stripper number J-1 may be characterized by about a 20-25% LOI and about 30-35% moisture, and the blanket leaving stripper number J-2 may be characterized by about a 20-25% LOI and about 20-25% moisture.

It will be understood that any number of strippers may be employed, the only requirement being that a sufficient number be available so that the final resident binder and moisture is at the desired level. In FIG. 2 room has been provided for two additional strippers as indicated by J-3 and J-4.

Upon leaving the stripper stations a separator film, 15, indicated at side station L, is added to the unrolled re-resinated blanket just prior to roll up in Station K. Forming the blanket into rolls facilitates storage or shipment and handling or at a subsequent processing station at a remote location. If desired, the blanket may be cut, as indicated by cutting mechanism 14, so that rolls of small diameter and thus a more convenient size for subsequent handling are formed, all as indicated for example at 16.

At Station M the rolls which have been processed in accordance with this invention are either stored or shipped to an off-site location.

It will be understood that storage at Station F may be eliminated if production requirements justify continuous production. In this event, the rolls formed at Station E would be transported directly to Station G.

Referring now specifically to FIGS. 3 and 4, the functioning of the re-resination Station H is illustrated in detail.

The partially treated blanket 11 which is sandwiched between upper and lower belts 12 and 13 enters the impregnator die assembly, indicated generally at 18, at the re-resination Station H. The die assembly includes upper die 19 and lower die 20 which are secured to one another by bolts 21, 22. A shim or other spacing means is indicated at 23 for purposes of adjusting the spacing between the die halves. It will be understood that the left edge of both upper die 19 and lower die 20 have been chamfered, as at 24 and 25, respectively, see FIG. 4, to facilitate entry of the sandwich to, the die assembly 18. Similar chamfers are indicated at 26,27 which enable the die to be installed in either direction. The upper die has an internal recess 29 formed therein and the bottom die has a mating, internal recess 30. The recesses 29, 30 form a plenum chamber 31. Preferably the width of the plenum chamber 31 corresponds to the width of the sandwiched blanket, as best seen in FIG. 3, so there is no fluid leakage around the edges of the sandwiched blanket when the blanket moves through the chamber in the direction of the arrow of FIG. 4. The edges of the interior surface of the internal walls of the recesses are chamfered as at 33, 34 and 35, 36 to facilitate smooth reception of the sandwiched blanket irrespective of the direction of movement of the sandwich through the die assembly.

An entry conduit through which resin suspended in a fluid, such as an aqueous medium, passes is indicated at 37. The terminal end 38 of the entry conduit opens into the lower portion of chamber 31. An exhaust conduit for resin and its carrier is indicated at 39, the entry end 40 of the exhaust conduit being in fluid communication with the upper portion of chamber 31. Anchor blocks for the resin conduits are indicated at 41, 42.

It will be understood that when the sandwich passes through the plenum chamber 31 with the edges of the sandwich in sliding contact with the side walls 43, 44 of the chamber 31, see FIG. 3, resin and its fluid carrier will be admitted under pressure from a nearby source, described hereinafter, and directed into the entry conduit 37 in the direction of the arrow. The resin entrained in the fluid will be, in effect, driven through the lower porous filter belt 13, then the blanket 11, and then the upper porous filter belt 12. A portion of the pressurized resin will be retained on the blanket 11 with a consequent increase in the weight of resin per unit area of blanket as contrasted to the entry weight per unit of area. Preferably the weight is increased to an amount in excess of the amount which is desired in the final product. The resin which is not retained on the blanket 11 passes into the upper portion of the plenum chamber 31 and then exits the die assembly through exhaust conduit 39 along with associated carrier fluid.

The operation of a typical vacuum stripper is illustrated in FIG. 5. The blanket 11, which now contains excess resin, together with the upper and lower filter cloths 12 and 13 enter the stripper while moving in the direction of the horizontal arrow. The stripper consists essentially of a left side frame member, indicated generally at 44 and a right side frame member, indicated generally at 45. The frame members include downwardly extending extension members 46, 47, which form between them an exhaust conduit 48 connected to a suitable source of vacuum which pulls a vacuum in the direction of the vertical arrow in FIG. 5. The frame members include upper plates 49, 50 whose flat, planar upper surfaces form a bed over which the blanket sandwich slides as it passes through the stripper. A back up member, in this instance a drum, is indicated at 51, the drum having a solid surface and a diameter large enough so that when the bottom of the drum is in contact with the upper side of filter cloth belt 12 there will be (a) only a slight depression of the sandwich, if any, and (b) a barrier to the passage of fluids in the area of drum-belt contact is formed. Preferably also the drum-belt contact area is at least as wide as the span between the inner edges of slide plates 49, 50 and directly aligned with the exhaust conduit 48. The constituents of the belts and the fibers on either side of the exhaust conduit 48 form a barrier to the dissipation of the vacuum and hence the effect of the vacuum will be confined to that portion of the blanket aligned with exhaust conduit 48. Since the sandwiched blanket is continuously moving across exhaust conduit 48, each increment of the blanket, and hence all droplets of uncured resin and resin carrier in each said increment, will be exposed to the suction action of the vacuum in exhaust conduit 48.

Referring now to Station H in FIG. 1 a binder recirculation system is there shown. Binder which is not retained by the blanket 11 as the blanket moves through the impregnator die assembly 18 leaves the die assembly via exhaust conduit 39 as earlier described. Exhaust conduit 39 carries the non-retained binder via suitable piping to a binder catch pan 53 as seen in FIG. 1. After collection in the bottom of the catch pan the recirculated resin enters pump 54 which discharges the resin into resin entry conduit 37 which, as above-described, terminates in plenum chamber 31. A binder supply tank is indicated at 55, the flow of binder from the tank 55 into catch pan 53 being regulated by any well-known means which senses a low level of resin in the catch pan and sends a signal which opens and closes a flow control valve in make up line 56.

Although a preferred embodiment of the invention has been illustrated and described it will be apparent to those skilled in the art that modifications may be made within the spirit and scope of the invention. Accordingly it is intended that the scope of the invention be limited solely by the scope by the hereinafter appended claims when interpreted in light of the relevant prior art, and not by the foregoing exemplary description.

I claim:

1. In a method of manufacturing a fiberglass product the steps of
    converting a stream of molten glass into a veil of glass fibers,
    applying a first binder to the veil of glass fibers in a first amount which is about 1/7th of the amount required in the fiberglass product,
    curing the glass fibers to which the first binder has been applied to form a blanket,
    applying a second binder to the blanker in an amount, which in combination with the first amount is in excess of a required amount in the final product, the second binder being in liquid form and being applied with a pressure sufficient to substantially impregnate the blanket, and
    stripping binder in excess of the desired amount from the blanket by application of vacuum to the blanket containing the excess binder.

2. The method of claim 1 further characterized in that the binder is a thermosetting resin.

3. The method of claim 2 further characterized in that the second binder is applied to the blanket at substantially ambient temperatures.

4. The method of claim 3 further characterized in that the blanket is rolled following curing and unrolled prior to applying the second binder.

5. The method of claim 3 further characterized in that the blanket is cut to a desired length following curing, thereafter rolled, and
    thereafter unrolled prior to applying the second binder.

6. The method of claim 3 further characterized in that the stripping of the excess binder after application of the second binder thereto is carried out by subjecting the blanket to a plurality of applications of vacuum.

7. The method of claim 6 further characterized in that the blanket is rolled following curing and unrolled prior to applying the second binder.

8. The method of claim 7 further characterized in that the blanket is cut to a desired length following curing, thereafter rolled, and thereafter unrolled prior to the application of the second binder.

9. The method of claim 8 further characterized by and including the step of adding a separator film to one surface of the blanket after the second application of binder and the stripping of excess binder therefrom, and thereafter forming the cut blanket into a roll.

10. The method of claim 1, wherein the first amount of first binder is on the order of about 1/7th of the required amount of binder in the final product.

11. The method of claim 1, wherein the application of the second binder is performed in a re-bindering chamber.

12. In a method of forming a fiberglass product, the steps of converting a stream of molten glass into a veil of glass fibers, applying a first binder to the veil of glass fibers in a first amount which is less than a required amount of binder in the final product, curing the glass fibers to which the first binder has been applied to form a cured and self-sustaining yet partially-bindered blanket, admitting the blanket to a re-bindering chamber, contacting the blanket in the chamber with a second binder under pressure in which said second binder is entrained to thereby add a second amount of second binder to the blanket, the first amount of first binder and the second amount of second binder of the blanket being in excess of the final desired binder content, and thereafter removing binder in excess of the final desired amount from the supplementarily bindered blanket by vacuum.

13. The method of claim 12 further characterized by and including the step of moving the cured blanket into the re-bindering chamber by holding the blanket between two porous belts which move with the cured blanket into the re-bindering chamber.

14. The method of claim 13 further characterized in that the vacuum is applied to the underside of the blanket containing excess binder as the blanket passes over a vacuum conduit, dilution of the vacuum in the region of the vacuum conduit being substantially prevented by the presence of a non-porous surface on the top side of the sandwiched blanket which is aligned with the vacuum conduit.

15. The method of claim 14, wherein the first amount on the order of about 1/7th of the required amount of binder in the final product.

16. In a method of forming a fiberglass product, the steps of converting a stream of molten glass into a veil of glass fibers, applying a first application of binder to the veil of glass fibers in an amount which is less than the desired amount of binder in the fiberglass product, curing the glass fibers to which the first binder has been applied to form a cured, partially bindered blanket, admitting the blanket to a re-bindering chamber, contacting the blanket in the re-bindering chamber with a second application of binder under pressure, the total of the first and second applications of binder to the blanket being in excess of the final desired binder content, and thereafter removing the binder in excess of the final desired binder content from the re-bindered blanket by vacuum.

17. The method of claim 16, further characterized in that the first application of binder is on the order of about 1/7th of the final desired binder content.

* * * * *